US011893410B2

(12) United States Patent
Srivastava et al.

(10) Patent No.: US 11,893,410 B2
(45) Date of Patent: Feb. 6, 2024

(54) SECURE STORAGE OF WORKLOAD ATTESTATION REPORTS IN A VIRTUALIZED AND CLUSTERED COMPUTER SYSTEM

(71) Applicant: VMware, Inc., Palo Alto, CA (US)

(72) Inventors: Abhishek Srivastava, Sunnyvale, CA (US); David A. Dunn, Sammamish, WA (US); Jesse Pool, Ottawa (CA); Adrian Drzewiecki, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 426 days.

(21) Appl. No.: 17/148,428

(22) Filed: Jan. 13, 2021

(65) Prior Publication Data

US 2022/0222098 A1    Jul. 14, 2022

(51) Int. Cl.
*G06F 9/455* (2018.01)
*G06F 9/50* (2006.01)
*G06F 21/53* (2013.01)

(52) U.S. Cl.
CPC .......... *G06F 9/45558* (2013.01); *G06F 9/505* (2013.01); *G06F 9/5077* (2013.01); *G06F 21/53* (2013.01); *G06F 2009/45587* (2013.01); *G06F 2009/45595* (2013.01)

(58) Field of Classification Search
CPC .... G06F 9/45558; G06F 9/505; G06F 9/5077; G06F 2009/45587; G06F 2009/45595; G06F 21/53
See application file for complete search history.

(56) References Cited

U.S. PATENT DOCUMENTS

| 8,656,482 B1* | 2/2014 | Tosa ..................... G06F 9/45558 713/153 |
| 2012/0324446 A1* | 12/2012 | Fries ................... G06F 9/45504 718/1 |
| 2014/0075522 A1 | 3/2014 | Paris et al. |

(Continued)

OTHER PUBLICATIONS

Mohamed, Rania. "Kubernetes Cluster vs Master Node". Available at https://www.suse.com/c/kubernetes-cluster-vs-master-node/. Accessible on Apr. 16, 2019 (Year: 2019).*

(Continued)

*Primary Examiner* — Michael W Ayers
(74) *Attorney, Agent, or Firm* — Kim & Stewart LLP

(57) ABSTRACT

An example method of secure attestation of a workload deployed in a virtualized computing system is described. The virtualized computing system includes a host cluster and a virtualization management server, the host cluster having hosts and a virtualization layer executing on hardware platforms of the hosts. The method includes storing, in a trust authority, a pre-defined attestation report for a workload executing in a virtual machine (VM) managed by the virtualization layer, the pre-defined attestation report including a hash of at least a portion of an image of the VM; receiving, at the trust authority from a security module of a host in which the VM executes, an attestation report generated by measuring memory of the VM; comparing the attestation report with the pre-defined attestation report; and generating an indication of validity for the workload based on a result of the comparison.

15 Claims, 11 Drawing Sheets

(56) References Cited

U.S. PATENT DOCUMENTS

| | | | |
|---|---|---|---|
| 2015/0254451 A1* | 9/2015 | Doane | G06F 21/44 |
| | | | 726/1 |
| 2016/0164880 A1* | 6/2016 | Colesa | G06F 21/53 |
| | | | 726/1 |
| 2016/0261592 A1 | 9/2016 | Hubert et al. | |
| 2016/0350535 A1* | 12/2016 | Garcia | G06F 21/572 |
| 2016/0366185 A1 | 12/2016 | Lee et al. | |
| 2017/0061128 A1 | 3/2017 | Novak et al. | |
| 2017/0104597 A1 | 4/2017 | Negi et al. | |
| 2017/0300309 A1 | 10/2017 | Berger et al. | |
| 2018/0096412 A1 | 4/2018 | Scott-Nash et al. | |
| 2018/0107608 A1 | 4/2018 | Kaplan et al. | |
| 2018/0247082 A1 | 8/2018 | Durham et al. | |
| 2019/0034617 A1 | 1/2019 | Scarlata et al. | |
| 2019/0102555 A1 | 4/2019 | Novak et al. | |
| 2019/0116110 A1* | 4/2019 | Raney | G06F 8/60 |
| 2019/0229924 A1 | 7/2019 | Chhabra et al. | |
| 2019/0370467 A1 | 12/2019 | Li | |
| 2019/0394096 A1 | 12/2019 | Bernat et al. | |
| 2021/0021619 A1 | 1/2021 | Smith et al. | |
| 2021/0081545 A1 | 3/2021 | Mulligan et al. | |
| 2021/0144517 A1 | 5/2021 | Guim Bernat et al. | |
| 2021/0266148 A1* | 8/2021 | Tsirkin | H04L 9/0894 |
| 2022/0103593 A1 | 3/2022 | Singh et al. | |

OTHER PUBLICATIONS

Arnautov, S. et al. "SCONE: Secure Linux Containers with Intel SGX," Proceedings of the 12th USENIX Symposium on Operating Systems Design and Implementation (OSDI '16), Nov. 2-4, 2016, Savannah, GA, USA, pp. 689-703.

* cited by examiner

SECURE STORAGE OF WORKLOAD ATTESTATION REPORTS IN A VIRTUALIZED AND CLUSTERED COMPUTER SYSTEM

With the institution of strong regulatory laws, it is becoming more apparent that noncompliance and security breaches could result in tangible monetary losses for organizations. Public infrastructure as a service (IaaS) cloud customers would prefer to not give access to sensitive data to their cloud vendors. However, a cloud vendor's hypervisor can access guest memory of the VMs it manages, which can include such sensitive data. Cloud vendors too, would find it appealing to not have to deal with the legal and regulatory obligations of handling such sensitive data if they could avoid it. With every passing year, the pace of system software development is only increasing resulting in a world of continuous change. The reported number of breaches into enterprise systems is also similarly trending higher each year, making enterprise security a crucial aspect of systems software.

Applications today are deployed onto a combination of virtual machines (VMs), containers, application services, and more in a virtualized computing system. For deploying such applications, a container orchestration platform known as Kubernetes® has gained in popularity among application developers. Kubernetes provides a platform for automating deployment, scaling, and operations of application containers across clusters of hosts. It offers flexibility in application development and offers several useful tools for scaling. Given the security concerns discussed above, customers and providers desire to leverage the use of encryption technologies to protect VM disk images and VM memory from access by the hypervisor in such virtualized computing systems. In addition, customers and providers desire to verify authenticity of the various components executing in such virtualized computing systems.

DETAILED DESCRIPTION

Figure 1:
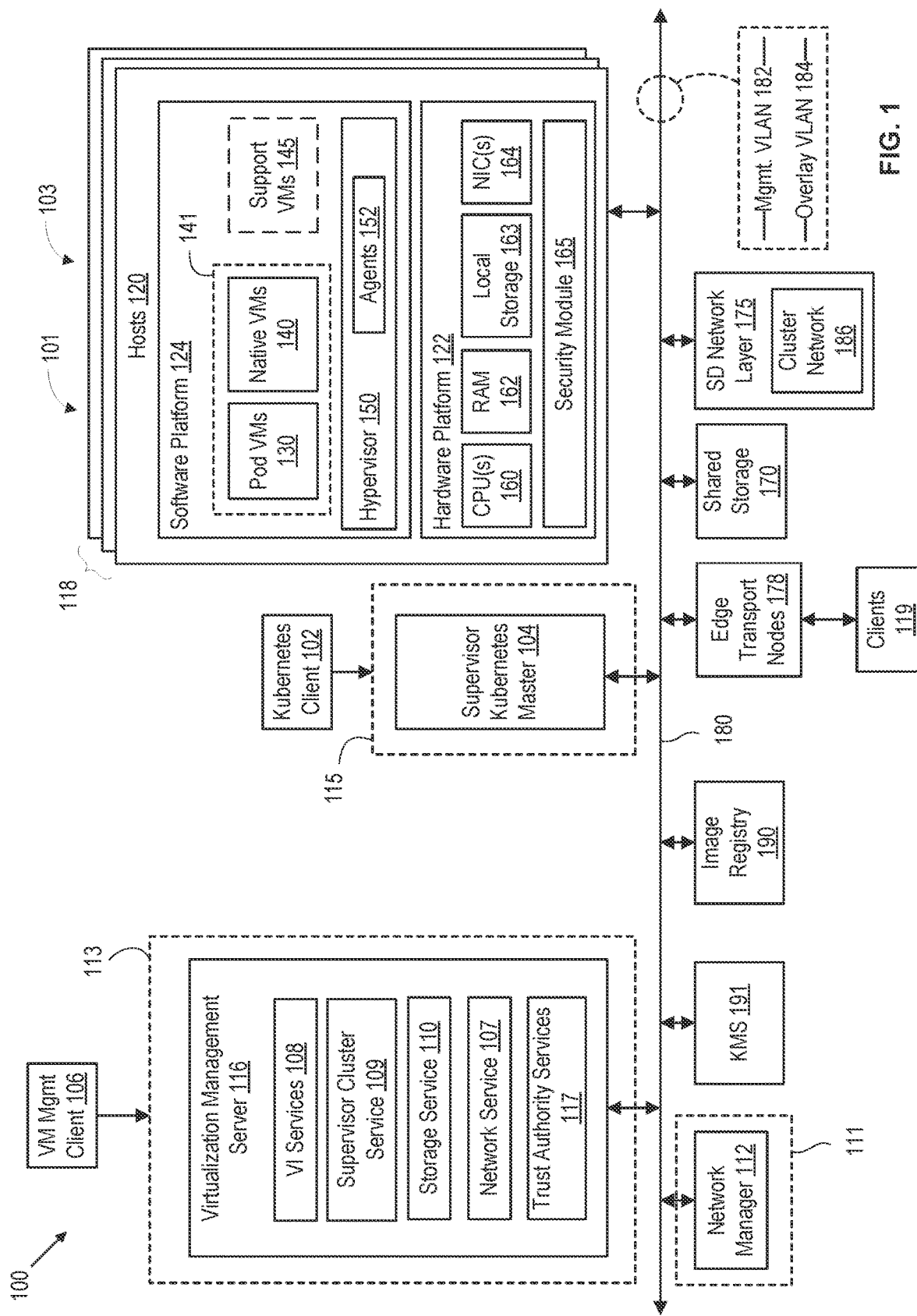
FIG. 1 is a block diagram of a clustered computer system in which embodiments may be implemented.

Secure storage of workload attestation reports in a virtualized computing system is described. Workloads running on a virtualization platform are instantiated in isolated and secure sandboxes referred to herein as virtual machines (VMs). Often, a workload owner needs to be able to determine that the instance of the workload that was started on the platform has not been tampered with prior to being instantiated. Platform security hardware technologies allow a VM owner to compare the cryptographic hash of the running workload with one that is known to be valid thus ensuring this is true. The attestation reports and cryptographic hashes of such workloads need to be stored securely within the cluster. Techniques described herein solve this need by leveraging the trusted platform module technology that is used to create a cluster of machines that are known to be running an uncompromised version of the hypervisor, which mediates access to a key manager to store the attestation reports of the workloads. The trust authority validates each workload that is run on the cluster by invoking an attestation flow, wherein it performs cryptographic verification of the running workload with the help of a platform security processor. The workloads that need to be instantiated are known upfront during cluster creation. Hence, the workload attestation reports are populated into the trust authority using a secure channel of communication and appropriate authentication. In embodiments, this is a one-time operation and the attestation reports are not changed over the course of the cluster's lifetime. When a new workload needs to be instantiated, a runtime generated attestation report is validated by the trust authority. These and further advantages and aspects of secure storage of workload attestation reports are described below with respect to the drawings.

Provisioning identity certificates using hardware-based secure attestation in a virtualized computing system is described. Running workloads at scale makes managing security and validating their identities all the more difficult. Hardware-based secure attestation technology allows workload owners to verify cryptographically the identity of the workload running on the platform and encrypt it against the hypervisor. Once such a validation is performed, the workloads need to be able to prove their identities to other components in the system. The techniques described herein solve this problem by proposing a means to distribute certificates to entities that have been validated using the secure channel that is setup as part of the hardware based secure attestation flow. When workloads are deployed into a cluster that has the ability to validate them using hardware-based secure attestation, the workloads go through a secure attestation flow which is initiated by the workload owner. Such a cluster will have a secure repository of attestation reports (e.g., the trust authority) for workloads that are admissible in the cluster, and when the workload is deployed, it will be checked for validity against its report to ensure it is valid. As part of this attestation flow, a secure channel is setup between the workload and the entity that is verifying it, allowing for a secret to be transmitted. The secure entity verifies the identity of the workload and assigns it a certificate that is rooted with its own certificate authority as part of the exchange. The workload can then present this certificate to other components in the cluster as proof of its identity. The other entities can verify the workload's identity using the certificate and checking its certificate authority and other cryptographic information present in the certificate. These and further advantages and aspects of provisioning identity certificates are described below with respect to the drawings.

Integrity protection of container image disks using hardware-based attestation in a virtualized computing system is described. Container applications that are instantiated on virtualization platforms often stage application binary code and data on virtual disk images. When such applications have strict security requirements, workload owners prefer to be able to validate the integrity of the application binaries that are being run within the cluster. Even though the application binaries can be integrity checked by the runtime prior to execution, there is the question of transmitting the integrity hash and key to the runtime in a secure fashion. In embodiments, container workloads are run like Kubernetes Pods within VMs. Container image disks are cached across the cluster by storing them on shared storage mediums in the form of virtual disks. In an embodiment, workload owners benefit from having the ability to ensure that all the container image disks in the cluster have not been tampered with prior to being run. The techniques described herein leverage hardware based secure attestation to transmit the integrity hash of the key securely to the container runtime running the application. Consider a cluster of hypervisors that has been setup to run container workloads. During the creation of such a cluster, components like the node agent that runs on each host in the cluster, are securely validated via a hardware based attestation flow. On completion of such a validation, they are assigned a certificate. The node agents are also provided with an integrity key which is to be used in the creation of an integrity-based filesystem for container images. When a workload owner requests a container to be run on such a cluster, the node agent stages the container image onto the virtual disk and use the integrity key to create an integrity verified filesystem. Once the container image disk has been created with such a filesystem, it will be attached to the appropriate workload VM (referred to herein as a pod VM). The pod VM which has undergone secure attestation as part of its creation is populated with the integrity key for its container image disk. These and further advantages and aspects of integrity protection are described below with respect to the drawings.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

Hardware platform 122 can further include a security module 165. Security module 165 can include, for example, a trusted platform module (TPM). A TPM comprises a microcontroller configured to secure hardware through integrated cryptographic keys. A TPM can be used to verify platform integrity, store keys for disk encryption/decryption, store keys for password protection, and the like. Security module 165 can include, for example, a Secure Encrypted Virtualization (SEV) module. While SEV is described as an example, it is to be understood that any other type of security module that functions the same or similar to that described can be used. An SEV module provides both runtime protection and ensures secure initialization of virtual machines (VMs). SEV allows for isolating VMs from hypervisors and other VMs cryptographically. A guest owner can verify the authenticity of a running guest via a secure channel to security module 165 (e.g., one or more integrated circuits). This ensures that a rogue or compromised hypervisor has not tampered with the guest image and does not have access to any data the guest deems as private. An SEV module can include an isolated Platform Security Processor (PSP) that can intercept every access to VM memory, and encrypt/decrypt based on a VM specific key. The actual key used to secure the VM memory never leaves the PSP. The PSP uses the address space ID (ASID) tagged with the VM memory block to determine the key it should use to decrypt. Each PSP contains a CEK (Chip Encryption Key) that is unique and signed by a central authority (e.g., the processor manufacturer). The PSP also generates a Platform Endorsement Key (PEK) using a secure entropy source when it starts up. This is used to negotiate a shared secret with a remote party. The PSP runs its own firmware and its memory is not accessible from main memory controller or any CPU on the system. Guests can control the pages to keep private from the hypervisor by setting a bit in the page tables.

Secure attestation of a guest operating system (OS) involves ensuring the following three conditions are met: 1. Running on Secure Hardware: The Guest is running on authentic hardware that has not been compromised and is not fake. This will ensure the presence of the PSP and its encryption/decryption engines. 2. Valid Measurement of GuestOS Image: A Guest Owner can verify whether the guest is running the appropriate software it should be, by obtaining a measurement from the PSP and it can verify this by accessing a secure database that is guaranteed to not have been compromised. 3. Confidential Data Access: Access to any confidential data that an attacker could modify or use to compromise the system is not provided to the guest unless the above two conditions have been verified by a trusted entity.

A typical attestation workflow for a VM is as follows. For a Guest Owner to verify that the guest that is running authentic software and has not been tampered with, it needs to establish a secure communication channel with the PSP and obtain a measurement of the guest. A measurement includes a hash of the guest's memory contents and is not deemed to change on every boot. Note that SEV is transparent to guest applications but guest kernels need to be made SEV aware to support this capability. Also note that although the hypervisor does act as a middleman for setting up the secure channel, the Guest Owner and the PSP use a Diffie Hellman Key Exchange (for example) to setup the secure channel so that the hypervisor cannot eavesdrop on it. The Guest Owner can verify the hash provided by the PSP of the guest, and only then proceed to deliver a disk decryption key to the guest. This allows the guest to decrypt the disk and process the confidential data. The guest VM is now fully operational and protected by SEV.

While security module 165 is shown as a separate component in hardware platform 122, it is to be understood that all or a portion of security module 165 can be integrated with other component(s), such as CPU 160.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA.

In the example of FIG. 1, host cluster 118 is enabled as a "supervisor cluster," described further herein, and thus VMs executing on each host 120 include pod VMs 130 and native VMs 140. A pod VM 130 is a virtual machine that includes a kernel and container engine that supports execution of containers, as well as an agent (referred to as a pod VM agent) that cooperates with a controller of an orchestration control plane 115 executing in hypervisor 150 (referred to as a pod VM controller). An example of pod VM 130 is described further below with respect to FIG. 2. VMs 130/140 support applications 141 deployed onto host cluster 118, which can include containerized applications (e.g., executing in either pod VMs 130 or native VMs 140) and applications executing directly on guest operating systems (non-containerized)(e.g., executing in native VMs 140). One specific application discussed further herein is a guest cluster executing as a virtual extension of a supervisor cluster. Some VMs 130/140, shown as support VMs 145, have specific functions within host cluster 118. For example, support VMs 145 can provide control plane functions, edge transport functions, and the like. An embodiment of software platform 124 is discussed further below with respect to FIG. 2.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs. For example, edge transport nodes 178 can be implemented in support VMs 145 and include a gateway of SD network layer 175. Various clients 119 can access service(s) in virtualized computing system through edge transport nodes 178 (including VM management client 106 and Kubernetes client 102, which as logically shown as being separate by way of example).

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualization management server 116 further enables host cluster 118 as a supervisor cluster 101. Virtualization management server 116 installs additional agents 152 in hypervisor 150 to add host 120 to supervisor cluster 101. Supervisor cluster 101 integrates an orchestration control plane 115 with host cluster 118. In embodiments, orchestration control plane 115 includes software components that support a container orchestrator, such as Kubernetes, to deploy and manage applications on host cluster 118. By way of example, a Kubernetes container orchestrator is described herein. In supervisor cluster 101, hosts 120 become nodes of a Kubernetes cluster and pod VMs 130 executing on hosts 120 implement Kubernetes pods. Orchestration control plane 115 includes supervisor Kubernetes master 104 and agents 152 executing in virtualization layer (e.g., hypervisors 150). Supervisor Kubernetes master 104 includes control plane components of Kubernetes, as well as custom controllers, custom plugins, scheduler extender, and the like that extend Kubernetes to interface with virtualization management server 116 and the virtualization layer. For purposes of clarity, supervisor Kubernetes master 104 is shown as a separate logical entity. For practical implementations, supervisor Kubernetes master 104 is implemented as one or more VM(s) 130/140 in host cluster 118. Further, although only one supervisor Kubernetes master 104 is shown, supervisor cluster 101 can include more than one supervisor Kubernetes master 104 in a logical cluster for redundancy and load balancing. Virtualized computing system 100 can include one or more supervisor Kubernetes masters 104 (also referred to as "master server(s)").

In an embodiment, virtualized computing system 100 further includes a storage service 110 that implements a storage provider in virtualized computing system 100 for container orchestrators. In embodiments, storage service 110 manages lifecycles of storage volumes (e.g., virtual disks) that back persistent volumes used by containerized applications executing in host cluster 118. A container orchestrator such as Kubernetes cooperates with storage service 110 to provide persistent storage for the deployed applications. In the embodiment of FIG. 1, supervisor Kubernetes master 104 cooperates with storage service 110 to deploy and manage persistent storage in the supervisor cluster environment. Other embodiments described below include a vanilla container orchestrator environment and a guest cluster environment. Storage service 110 can execute in virtualization management server 116 as shown or operate independently from virtualization management server 116 (e.g., as an independent physical or virtual server).

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, CA.

Network manager 112 can deploy one or more transport zones in virtualized computing system 100, including VLAN transport zone(s) and an overlay transport zone. A VLAN transport zone spans a set of hosts 120 (e.g., host cluster 118) and is backed by external network virtualization of physical network 180 (e.g., a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs). Host-to-host traffic for the overlay transport zone is carried by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

In an embodiment, system 100 further includes an image registry 190. As described herein, containers of supervisor cluster 101 execute in pod VMs 130. The containers in pod VMs 130 are spun up from container images managed by image registry 190. Image registry 190 manages images and image repositories for use in supplying images for containerized applications.

Virtualization management server 116 implements a virtual infrastructure (VI) control plane 113 of virtualized computing system 100. VI control plane 113 controls aspects of the virtualization layer for host cluster 118 (e.g., hypervisor 150). Network manager 112 implements a network control plane 111 of virtualized computing system 100. Network control plane 111 controls aspects SD network layer 175.

Virtualization management server 116 can include a supervisor cluster service 109, storage service 110, network service 107, protection service(s), and VI services 108. Supervisor cluster service 109 enables host cluster 118 as supervisor cluster 101 and deploys the components of orchestration control plane 115. VI services 108 include various virtualization management services, such as a distributed resource scheduler (DRS), high-availability (HA) service, single sign-on (SSO) service, virtualization management daemon, and the like. Network service 107 is configured to interface an API of network manager 112. Virtualization management server 116 communicates with network manager 112 through network service 107.

Virtualization management server 116 can include trust authority services 117. Trust authority services 117 provide access to encryption keys while ensuring that remote clients are authentic software and running with an approved secure configuration. Trust authority services 117 can provide a front-end to a key management service (KMS) 191, which can be part of virtualized computing system 100 or separate from virtualized computing system 100.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, deploy and manage image registry 190, and the like.

Kubernetes client 102 represents an input interface for a user to supervisor Kubernetes master 104. Kubernetes client 102 is commonly referred to as kubectl. Through Kubernetes client 102, a user submits desired states of the Kubernetes system, e.g., as YAML documents, to supervisor Kubernetes master 104. In embodiments, the user submits the desired states within the scope of a supervisor namespace. A "supervisor namespace" is a shared abstraction between VI control plane 113 and orchestration control plane 115. Each supervisor namespace provides resource-constrained and authorization-constrained units of multi-tenancy. A supervisor namespace provides resource constraints, user-access constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD network layer 175). User-access constraints include definitions of users, roles, permissions, bindings of roles to users, and the like. Each supervisor namespace is expressed within orchestration control plane 115 using a namespace native to orchestration control plane 115 (e.g., a Kubernetes namespace or generally a "native namespace"), which allows users to deploy applications in supervisor cluster 101 within the scope of supervisor namespaces. In this manner, the user interacts with supervisor Kubernetes master 104 to deploy applications in supervisor cluster 101 within defined supervisor namespaces.

While FIG. 1 shows an example of a supervisor cluster 101, the techniques described herein do not require a supervisor cluster 101. In some embodiments, host cluster 118 is not enabled as a supervisor cluster 101. In such case, supervisor Kubernetes master 104, Kubernetes client 102, pod VMs 130, supervisor cluster service 109, and image registry 190 can be omitted. While host cluster 118 is show as being enabled as a transport node cluster 103, in other embodiments network manager 112 can be omitted. In such case, virtualization management server 116 functions to configure SD network layer 175.

Figure 2:
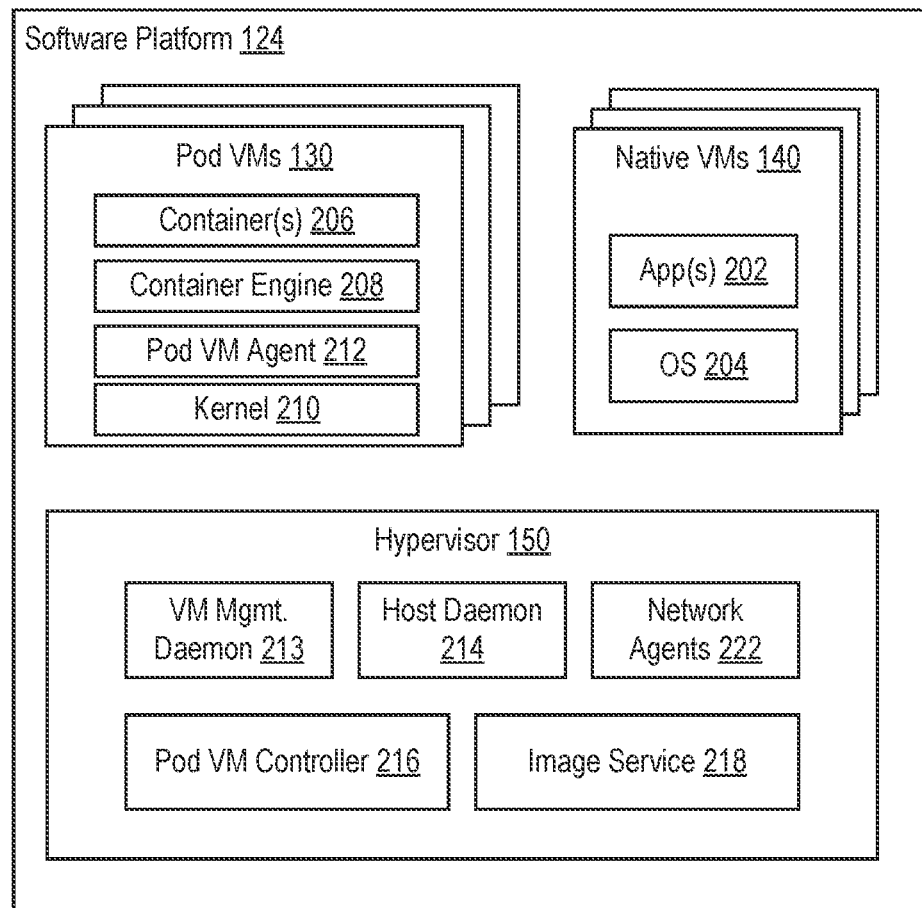
FIG. 2 is a block diagram depicting a software platform according an embodiment.

FIG. 2 is a block diagram depicting software platform 124 according an embodiment. As described above, software platform 124 of host 120 includes hypervisor 150 that supports execution of VMs, such as pod VMs 130, native VMs 140, and support VMs 145. In an embodiment, hypervisor 150 includes a VM management daemon 213, a host daemon 214, a pod VM controller 216, an image service 218, and network agents 222 VM management daemon 213 is an agent 152 installed by virtualization management server 116. VM management daemon 213 provides an interface to host daemon 214 for virtualization management server 116. Host daemon 214 is configured to create, configure, and remove VMs (e.g., pod VMs 130 and native VMs 140). Note that pod VM controller 216 is configured to manage and deploy pod VMs 130 on behalf of master server 104 and is distinct from the concept of Kubernetes controllers executing in the master server 104.

Pod VM controller 216 is an agent 152 of orchestration control plane 115 for supervisor cluster 101 and allows supervisor Kubernetes master 104 to interact with hypervisor 150. Pod VM controller 216 configures the respective host as a node in supervisor cluster 101. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured. Pod VM controller 216 is omitted if host cluster 118 is not enabled as a supervisor cluster 101. Pod VM controller 216 can execute as a process within hypervisor 150. However, in an embodiment, pod VM controller 216 executes in a VM, such as a pod VM 130 or a native VM 140.

Image service 218 is configured to pull container images from image registry 190 and store them in shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images. Image service 218 communicates with pod VM controller 216 during spin-up and configuration of pod VMs 130. In some embodiments, image service 218 is part of pod VM controller 216. In embodiments, image service 218 utilizes system VMs 130/140 in support VMs 145 to fetch images, convert images to container image virtual disks, and cache container image virtual disks in shared storage 170.

Network agents 222 comprises agents 152 installed by network manager 112. Network agents 222 are configured to cooperate with network manager 112 to implement logical network services. Network agents 222 configure the respective host as a transport node in a cluster 103 of transport nodes.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux® kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd. Pod VMs 130, pod VM controller 216, and image service 218 are omitted if host cluster 118 is not enabled as a supervisor cluster 101.

Figure 3:
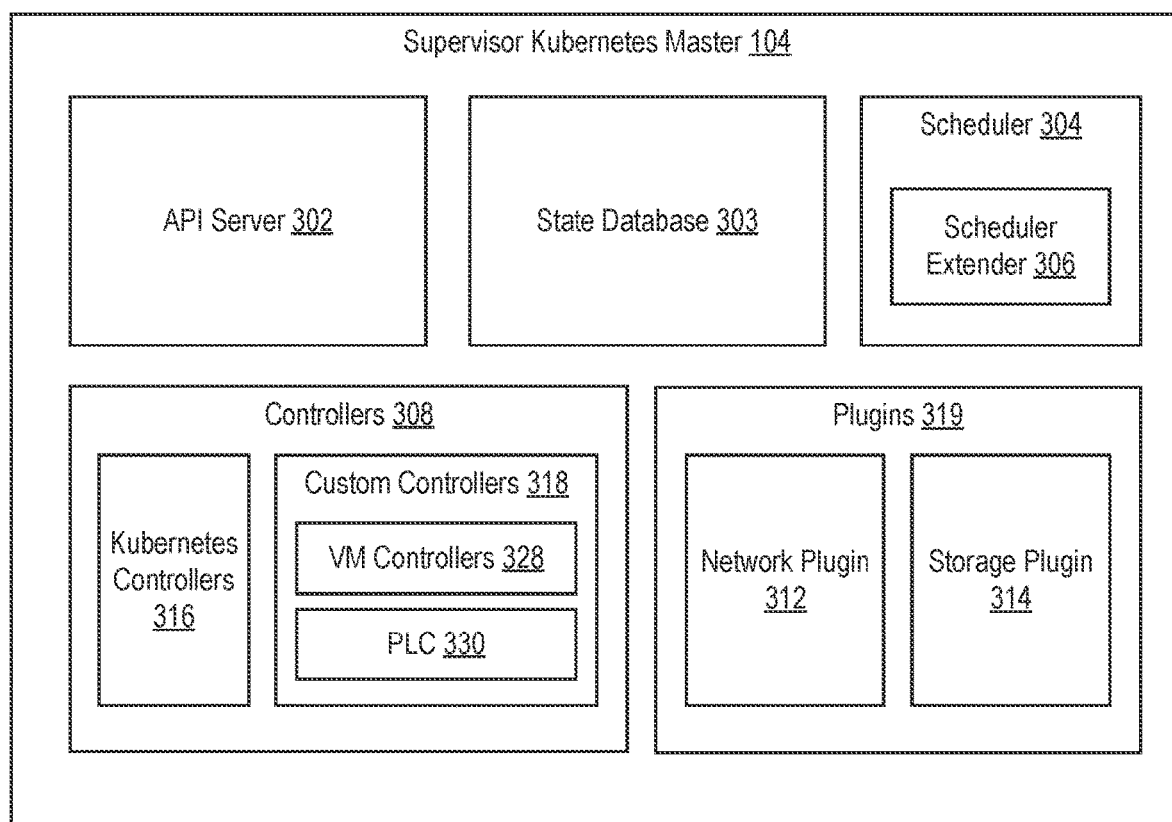
FIG. 3 is a block diagram of a supervisor Kubernetes master according to an embodiment.

FIG. 3 is a block diagram of supervisor Kubernetes master 104 according to an embodiment. Supervisor Kubernetes master 104 includes application programming interface (API) server 302, a state database 303, a scheduler 304, a scheduler extender 306, controllers 308, and plugins 319. API server 302 includes the Kubernetes API server, kube-api-server ("Kubernetes API") and custom APIs. Custom APIs are API extensions of Kubernetes API using either the custom resource/operator extension pattern or the API extension server pattern. Custom APIs are used to create and manage custom resources, such as VM objects for native VMs. API server 302 provides a declarative schema for creating, updating, deleting, and viewing objects.

State database 303 stores the state of supervisor cluster 101 (e.g., etcd) as objects created by API server 302. A user can provide application specification data to API server 302 that defines various objects supported by the API (e.g., as a YAML document). The objects have specifications that represent the desired state. State database 303 stores the objects defined by application specification data as part of the supervisor cluster state. Standard Kubernetes objects ("Kubernetes objects") include namespaces, nodes, pods, config maps, secrets, among others. Custom objects are resources defined through custom APIs (e.g., VM objects).

Namespaces provide scope for objects. Namespaces are objects themselves maintained in state database 303. A namespace can include resource quotas, limit ranges, role bindings, and the like that are applied to objects declared within its scope. VI control plane 113 creates and manages supervisor namespaces for supervisor cluster 101. A supervisor namespace is a resource-constrained and authorization-constrained unit of multi-tenancy managed by virtualization management server 116. Namespaces inherit constraints from corresponding supervisor cluster namespaces Config maps include configuration information for applications managed by supervisor Kubernetes master 104. Secrets include sensitive information for use by applications managed by supervisor Kubernetes master 104 (e.g., passwords, keys, tokens, etc.). The configuration information and the secret information stored by config maps and secrets is generally referred to herein as decoupled information. Decoupled information is information needed by the managed applications, but which is decoupled from the application code.

Controllers 308 can include, for example, standard Kubernetes controllers ("Kubernetes controllers 316") (e.g., kube-controller-manager controllers, cloud-controller-manager controllers, etc.) and custom controllers 318. Custom controllers 318 include controllers for managing lifecycle of Kubernetes objects 310 and custom objects. For example, custom controllers 318 can include a VM controllers 328 configured to manage VM objects and a pod VM lifecycle controller (PLC) 330 configured to manage pods. A controller 308 tracks objects in state database 303 of at least one resource type. Controller(s) 318 are responsible for making the current state of supervisor cluster 101 come closer to the desired state as stored in state database 303. A controller 318 can carry out action(s) by itself, send messages to API server 302 to have side effects, and/or interact with external systems.

Plugins 319 can include, for example, network plugin 312 and storage plugin 314. Plugins 319 provide a well-defined interface to replace a set of functionality of the Kubernetes control plane. Network plugin 312 is responsible for configuration of SD network layer 175 to deploy and configure the cluster network. Network plugin 312 cooperates with virtualization management server 116 and/or network manager 112 to deploy logical network services of the cluster network. Network plugin 312 also monitors state database for custom objects, such as NIF objects. Storage plugin 314 is responsible for providing a standardized interface for persistent storage lifecycle and management to satisfy the needs of resources requiring persistent storage. Storage plugin 314 cooperates with virtualization management server 116 and/or persistent storage manager 110 to implement the appropriate persistent storage volumes in shared storage 170.

Scheduler 304 watches state database 303 for newly created pods with no assigned node. A pod is an object supported by API server 302 that is a group of one or more containers, with network and storage, and a specification on how to execute. Scheduler 304 selects candidate nodes in supervisor cluster 101 for pods. Scheduler 304 cooperates with scheduler extender 306, which interfaces with virtualization management server 116. Scheduler extender 306 cooperates with virtualization management server 116 (e.g., such as with DRS) to select nodes from candidate sets of nodes and provide identities of hosts 120 corresponding to the selected nodes. For each pod, scheduler 304 also converts the pod specification to a pod VM specification, and scheduler extender 306 asks virtualization management server 116 to reserve a pod VM on the selected host 120. Scheduler 304 updates pods in state database 303 with host identifiers.

Kubernetes API 302, state database 303, scheduler 304, and Kubernetes controllers 316 comprise standard components of a Kubernetes system executing on supervisor cluster 101. Custom controllers 318, plugins 319, and scheduler extender 306 comprise custom components of orchestration control plane 115 that integrate the Kubernetes system with host cluster 118 and VI control plane 113.

Referring to FIGS. 1-3, the power on workflow for a pod VM 130 goes through a set of steps that are relevant to the techniques described herein. The request for starting a pod VM 130 is forwarded to virtualization management server 116 (e.g., to DRS by scheduler extender 306), which will choose an appropriate host to create and start pod VM 130. Once this process completes, pod VM controller 216 on that host will notice that a Pod was assigned to that host, and it will obtain the complete pod specification from supervisor Kubernetes master 104. If the pod has a Persistent Volume Claim (PVC), storage service 110 will allocate a disk in shared storage 170 based on the specifications in the claim. This data disk (e.g., Persistent Volume) is used by workloads to store any data that is persisted across the lifetime of an individual pod. Image service 218 will fetch and resolve the container images present in the pod specification and stage them on virtual disks. These image disks consist of the binaries and dependencies required for the container to run and their contents can be verified by hashes stored in image registry 190. Pod VM controller 216 will attach these virtual disks to the pod, after which, pod VM agent 212 takes over and starts the containers within pod VM 130. Pod VM controller 216 will only periodically monitor the state of the running containers by querying pod VM agent 212 and report these back to supervisor Kubernetes master 104.

Figure 4:
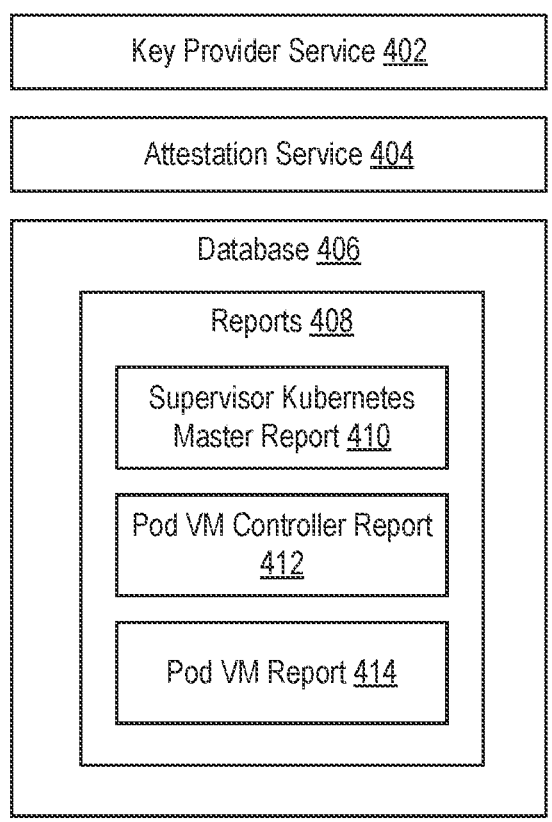
FIG. 4 is a block diagram depicting trust authority services according to an embodiment.

FIG. 4 is a block diagram depicting trust authority services 117 according to an embodiment. Trust authority services 117 include key provider service 402, attestation service 404, and database 406. Key provider service 402 is an abstraction layer that hides the implementation details of a back-end Key Management Service (e.g., KMS 191). There are many different KMS solutions, both on-prem and in the cloud, but key provider service 402 presents a consistent API regardless of the system used for long-term key storage. Key provider service 402 also restricts encryption key access to clients who have been approved by attestation service 404 as being authentic software with the required security configuration settings enabled.

Attestation service 404 is responsible for verifying the authenticity and configuration of a remote host 120. For example, a host 120 is authentic if it booted signed software and UEFI Secure Boot is enabled. Attestation service 404 uses a remote attestation protocol in cooperation with security module 165 to establish that the client's security module 165 is trustworthy and to verify a report that is produced by the trustworthy security module 165. If an attestation service client is able to present a verifiable report, then it will be issued a signed token that includes claims regarding the client's software version, and its configuration. When a client service requires access to encryption keys it must first generate a signed report from security module 165 that describes the state of host 120 at boot time. This can include measurements of all of the software components that have been loaded, as well as any relevant security configuration (Secure Boot enabled, core dumps encrypted, etc.). This report is sent to attestation service 404, which verifies the report based on its own known-good software measurements and certificates. Once the client has received a token from attestation service 404, it can present the token to key provider service 402 as proof of the client's authenticity when requesting encryption key access. Database 406 store reports 408 used by attestation service 404 for verifying reports submitted by clients. In embodiments, reports 408 include measurements of elements in supervisor cluster 101, including supervisor Kubernetes master 104, pod VM controller 216, and pod VMs 130. Thus, reports 408 include supervisor Kubernetes master report 410, pod VM controller report 412, and pod VM report 414.

Figure 5:
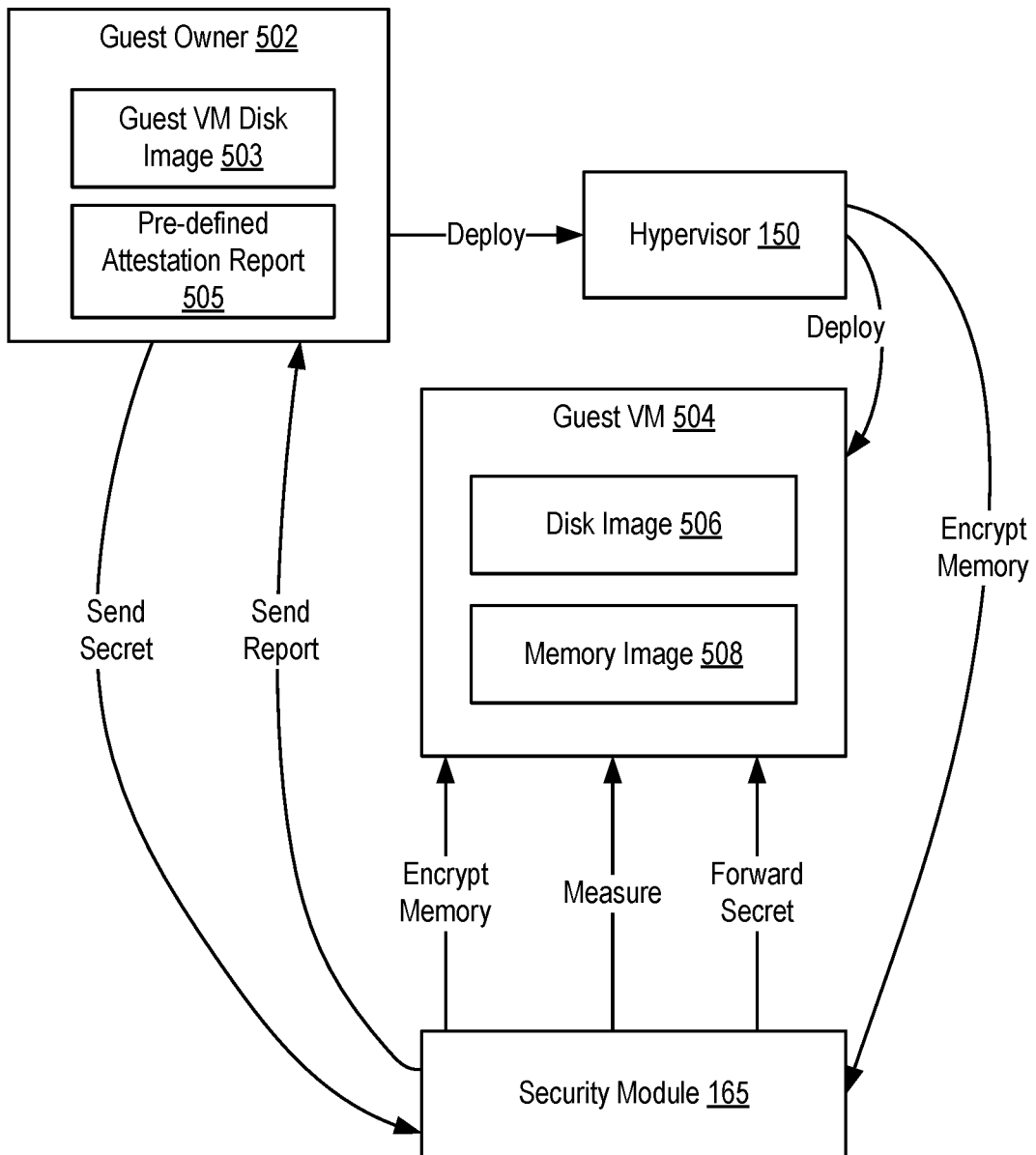
FIG. 5 is a flow diagram depicting a method of secure attestation of a guest virtual machine (guest) according to an embodiment.

FIG. 5 is a block diagram depicting a workflow for secure attestation of a guest virtual machine (guest) according to an embodiment. In the workflow, a guest owner 502 maintains a guest VM disk image 503. In embodiments, guest owner 502 is virtualization server 116. Guest owner 502 deploys the guest VM disk image 503 to hypervisor 150 in a host 120 for deploying a guest VM 504. Guest VM 504 can be a native VM 140 or a pod VM 130. Guest VM 504 includes a disk image 506 and a memory image 508. Disk image 506 is a copy of guest VM disk image 503 and may be encrypted by guest owner 502. Disk image 506 includes a portion that is unencrypted, which guest VM 504 can load into memory during boot. Memory image 508 is at least a portion of disk image 506 loaded into RAM 162 of host 120 (e.g., the memory of guest VM 504) and is at least a portion of the contents of the memory of guest VM 504. Memory image 508 includes content that is unlikely to change across a plurality of boots of guest VM 504. Guest YM 504 must successfully complete the attestation workflow in order to decrypt disk image 506 and complete deployment on hypervisor 150. Guest owner 502 maintains the secret for decrypting disk image 506.

In the workflow, guest VM 504 establishes a secure channel with security module 165 to encrypt the memory of guest VM 504 and to obtain a measurement of memory image 508. In an embodiment, the measurement includes a hash of memory image 508. While hypervisor 150 may act in the middle to setup the secure channel between guest VM 504 and security module 165, guest VM 504 and security module 165 can encrypt communications across the secure channel preventing any potential monitoring of the communications by hypervisor 150. Guest owner 502 establishes a secure channel with security module 165 and receives an attestation report, which includes the hash of memory image 508. Guest owner 502 maintains a pre-defined attestation report 505, which includes a hash generated by guest owner 502. Guest owner 502 compares the attestation report received from security module 165 with pre-defined attestation report 505 to verify authenticity. If authentic, guest owner 502 returns a secret to security module 165. Security module 165 forwards the secret to guest VM 504. The secret can include, for example, a decryption key for decrypting disk image 506. The secret can include other content, such as a public/private key pair, a signed certificate, and the like, which guest VM 504 can use to verify it is authentic to other entities.

Figure 6:
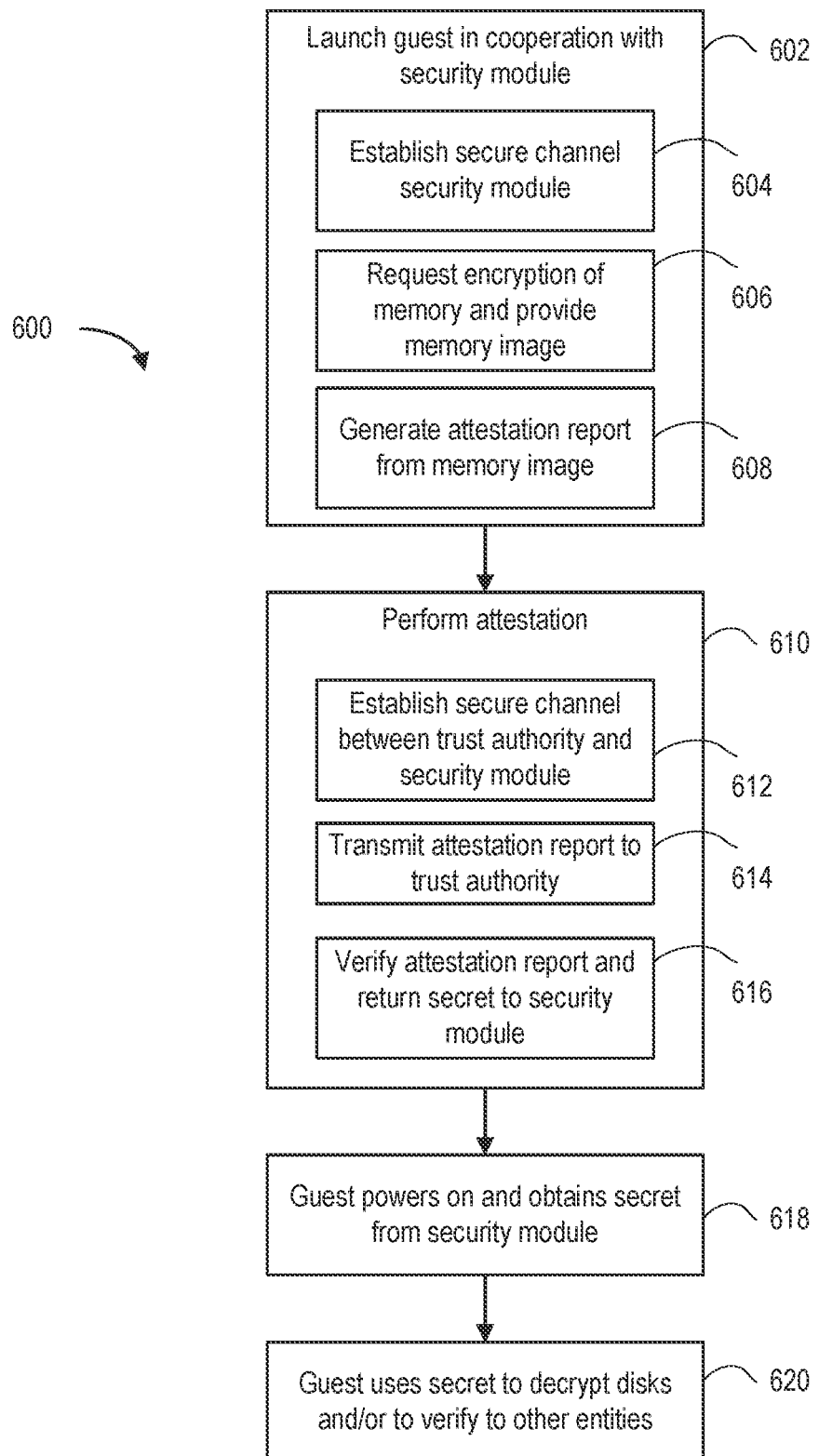
FIG. 6 is a flow diagram depicting a method of secure attestation of a guest virtual machine (guest) according to an embodiment.

FIG. 6 is a flow diagram depicting a method 600 of secure attestation of a guest virtual machine (guest) according to an embodiment. In the embodiment, trust authority services 117 functions as guest owner 502 for the purpose of attestation. The guest may be a native VM 140 or a pod VM 130. Method 600 begins at step 602, where the guest is launched in cooperation with security module 165. Virtualization management server 116 requests host daemon 214 in hypervisor 150 to power on guest VM 504. During launch, guest YM 504 loads a portion of disk image 506 into its memory to create memory image 508. Guest VM 504 establishes a secure channel with security module 165 (step 604). Guest YM 504 requests security module 165 to encrypt its memory and provides memory image 508 for measurement. Security module 165 generates an attestation report from memory image 508 (e.g., a hash of memory image 508).

At step 610, trust authority services 117 (trust authority) cooperate with security module 165 to perform remote attestation. In embodiments, remote attestation begins at step 612, where trust authority services 117 (e.g., attestation service 404) establishes a secure channel with security module 165. At step 614, security module 165 transmits the attestation report to trust authority services 117. At step 616, trust authority services 117 verifies the attestation report against predefined attestation report 505 (e.g., reports 408 in database 406). If valid, trust authority services 117 return a secret to security module 165.

At step 618, the guest powers on and obtains the secret from the security module 165. At step 620, the guest can use the secret to present to other entities as proof that it is trusted and/or access confidential data on disk image 506 (e.g., decrypt disk image 506).

Figure 7:
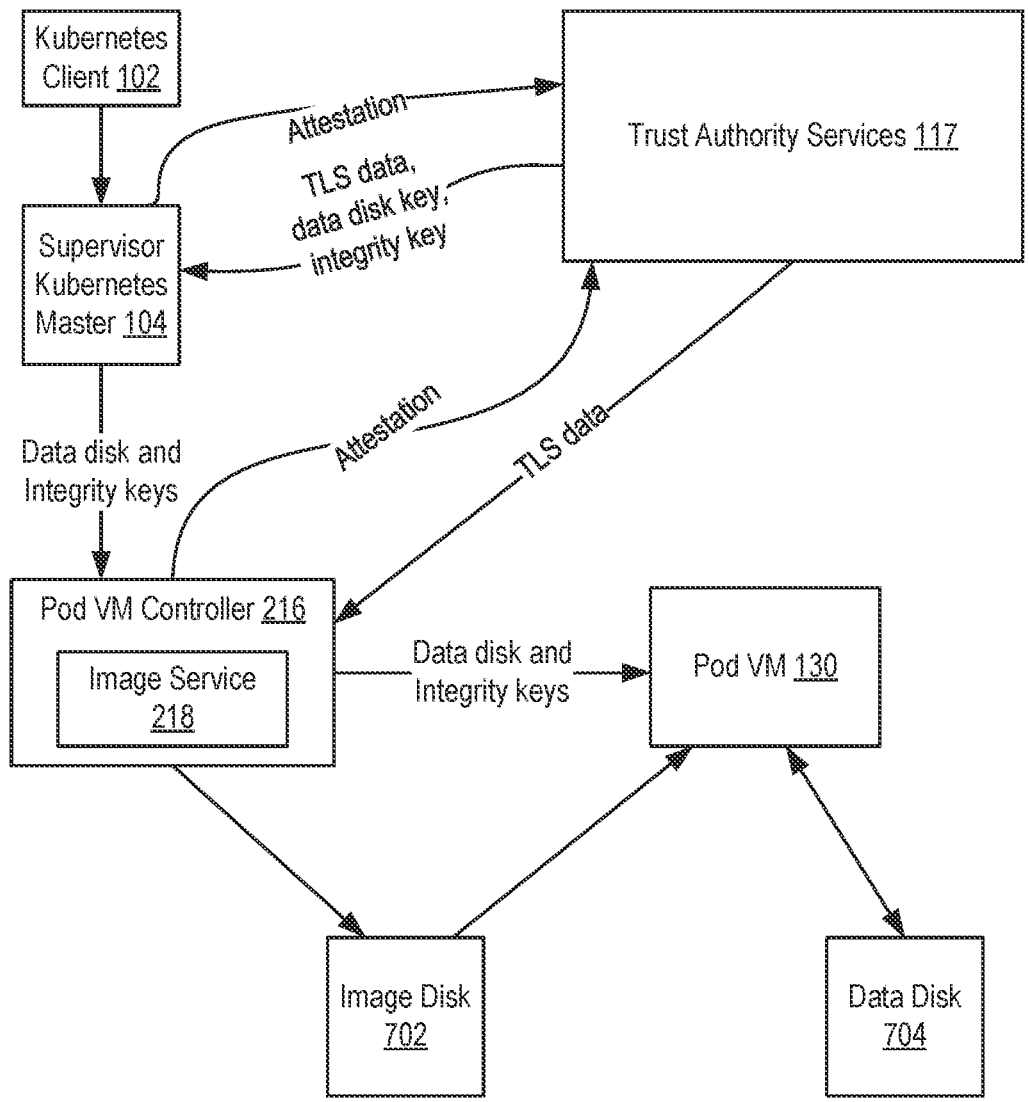
FIG. 7 is a block diagram depicting an attestation workflow in a supervisor cluster according to an embodiment.

FIG. 7 is a block diagram depicting an attestation workflow in a supervisor cluster 101 according to an embodiment. Supervisor cluster 101 includes three components that can use the attestation workflow and method described above to verify authenticity and obtain secrets for decryption: supervisor Kubernetes master 104, pod VM controller 216 (executing as a VM, such as a pod VM 130), and each pod VM 130. For purposes of clarity, native VMs 140 are omitted from discussion, but the attestation process discussed with respect to pod VMs 130 is also applicable to any native VMs 140 managed by supervisor Kubernetes master 104. The workflow in FIG. 7 can be understood with respect to methods of attestation discussed below in FIGS. 8-10 for each of supervisor Kubernetes master 104, pod VM controller 216, and pod VM 130.

Figure 8:
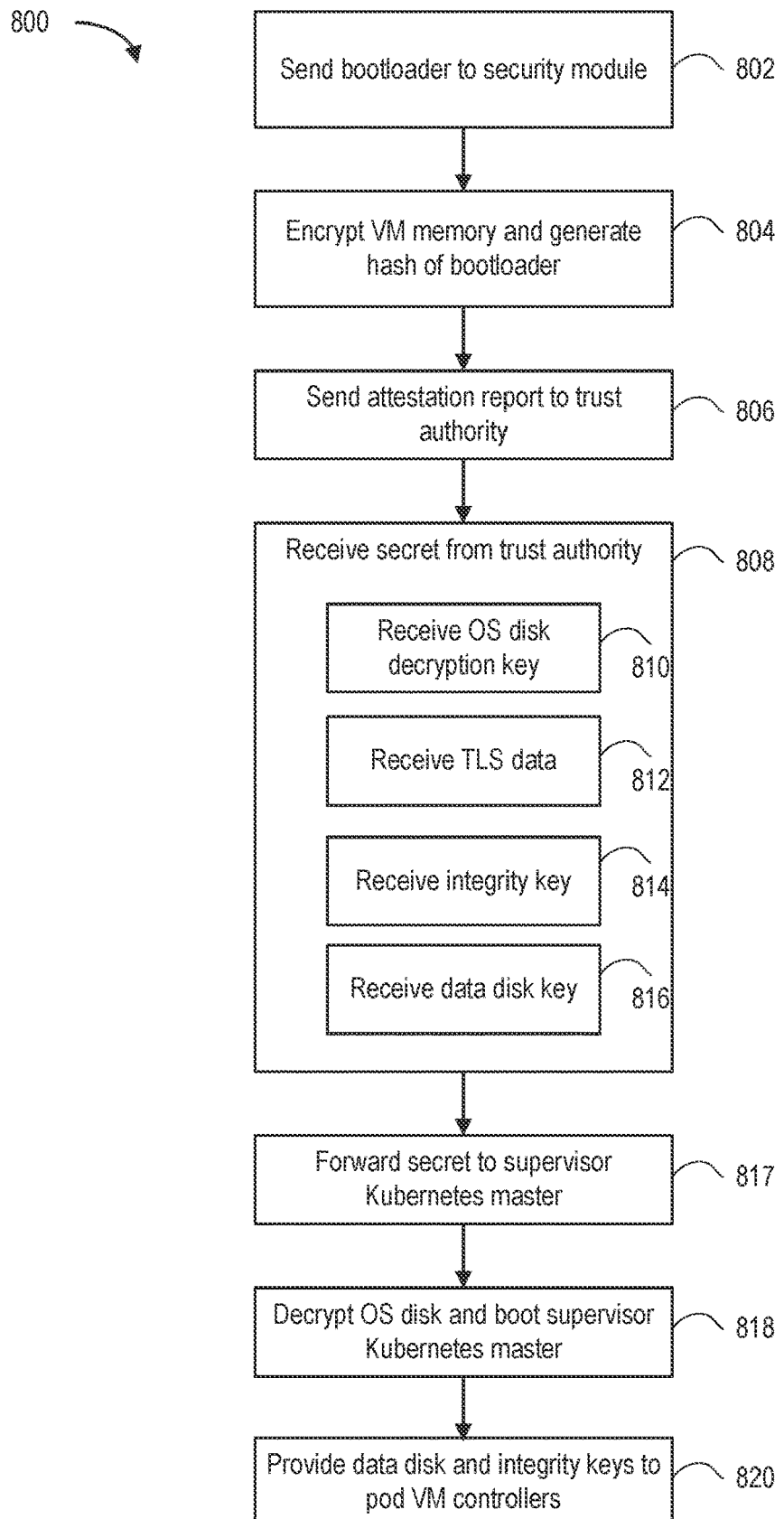
FIG. 8 is a flow diagram depicting a method of secure attestation of a supervisor Kubernetes master according to an embodiment.

FIG. 8 is a flow diagram depicting a method 800 of secure attestation of a supervisor Kubernetes master 104 according to an embodiment. In an embodiment, for supervisor Kubernetes master 104, guest VM disk image 503 is encrypted with only a bootloader being accessible and loaded into memory during boot. The bootloader functions to establish a secure channel between supervisor Kubernetes master 104 and security module 165. Method 800 begins a step 802, where supervisor Kubernetes master 104 sends bootloader (e.g., memory image 508) to security module 165. At step 804, security module 165 encrypts the memory of supervisor Kubernetes master 104 and generates a hash of the bootloader (e.g., an attestation report for memory image 508). At step 806, security module 165 sends an attestation report to trust authority services 117 for verification. As discussed above, trust authority services 117 verifies the attestation report against pre-defined attestation reports. If valid, trust authority services 117 returns a secret to security module 165.

At step 808, security module 165 receives a secret from trust authority services 117. For example, at step 810, security module 165 receives an OS disk decryption key. That is, a decryption key for decrypting disk image 506. At step 812, security module 165 receives Transport Layer Security (TLS) data for supervisor Kubernetes master 104. The TLS data can include a public/private key pair generated for the supervisor Kubernetes master 104. The TLS data can include a certificate, signed by a trusted authority, that verifies ownership of the public key by supervisor Kubernetes master 104. At step 814, security module 165 can receive an integrity key. The integrity key is eventually passed onto pod VM controllers 216 in order to generate integrity-based filesystems on container image disks for pod VMs. Pod VM controllers 216 in turn pass on the integrity-key to pod VMs 130 so that the pod VMs 130 can verify integrity of attached container-image disks. At step 816, security module 165 can receive a data disk key. The data disk key can be used by pod VMs to decrypt the contents of persistent volumes attached thereto.

At step 817, security module 165 forwards the secret to supervisor Kubernetes master 104. At step 818, supervisor Kubernetes master uses OS disk decryption key to decrypt the OS disk and boot (e.g., decrypt disk image 506). At step 820, supervisor Kubernetes master 104 distributes data disk and integrity keys to pod VM controllers 216 in host cluster 118. As discussed below, pod VM controllers 216 provide data disk key to pod VMs 130 for use in decrypting any persistent volumes attached thereto, and the integrity key to verify integrity of attached container image disks.

Figure 9:
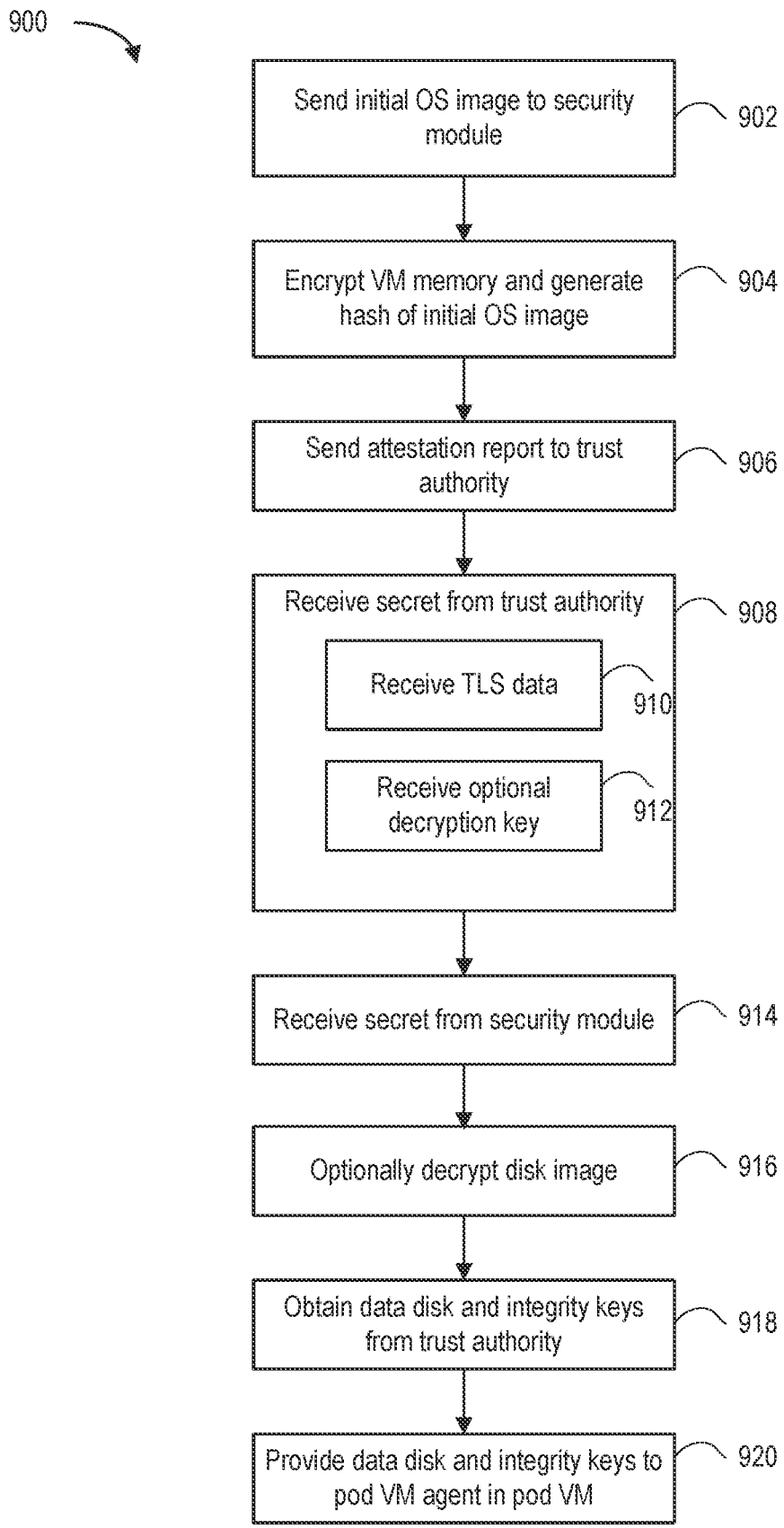
FIG. 9 is a flow diagram depicting a method of secure attestation of a pod VM controller according to an embodiment.

FIG. 9 is a flow diagram depicting a method 900 of secure attestation of a pod VM controller 216 according to an embodiment. In the embodiment, pod VM controller 216 executes in a VM, such as a pod YM 130 rather than as a process in hypervisor 150. Image service 218 is included as part of pod VM controller 216 and also executes in the VM. In the embodiment, for pod VM controller 216, guest VM disk image 503 includes an initial OS portion that can be loaded into memory of the VM and optionally an encrypted portion. The initial OS portion loaded into memory functions to establish a secure channel between pod VM controller 216 and security module 165. Method 900 begins at step 902, where pod VM controller 216 sends the initial OS image to security module 165 (e.g., memory image 508). In embodiments, initial OS image is the entire OS image for pod VM controller 216. In other embodiments, initial OS image is a portion of VM disk image 503 with some remaining portion of VM disk image 503 being encrypted.

At step 904, security module 165 encrypts the memory of pod VM controller 216 and generates a hash of the initial OS image (e.g., an attestation report) At step 906, security module 165 sends the attestation report to trust authority services 117. As discussed above, trust authority services 117 verifies the attestation report against pre-defined attestation reports. If valid, trust authority services 117 returns a secret to security module 165. At step 908, security module 165 receives the secret from trust authority services 117. For example, at step 910, security module 165 receives TLS data (e.g., a public/private key pair and signed certificate). At step 912, security module 165 optionally receives a decryption key for the guest VM disk image 503 (if any portion is encrypted).

At step 914, pod VM controller 216 receives the secret from security module 165. At step 916, pod VM controller 216 optionally decrypts its guest VM disk image 503 (if any portion was encrypted) with a decryption key in the secret. Step 916 can be omitted if no portion of guest VM disk image 503 for pod VM controller 216 is encrypted. At step 918, pod VM controller 216 obtains data disk and integrity keys from trust authority services 117. Pod VM controller 216 can verify its identity with trust authority services 117 and securely obtain the keys using the obtained TLS data. In embodiments, the container image disks for pod VMs 130 are protected using an integrity-based filesystem. Pod VMs 130 require integrity key to verify container image disks, which is obtained from pod VM controller 216. In embodiments, a pod VM 130 can be attached to a persistent disk, which may be encrypted. Pod VMs 130 require the data disk key to decrypt any attached persistent disks. At step 920, pod VM controller 216 provides data disk and integrity keys to pod VM agent 212 in pod VM 130.

Figure 10:
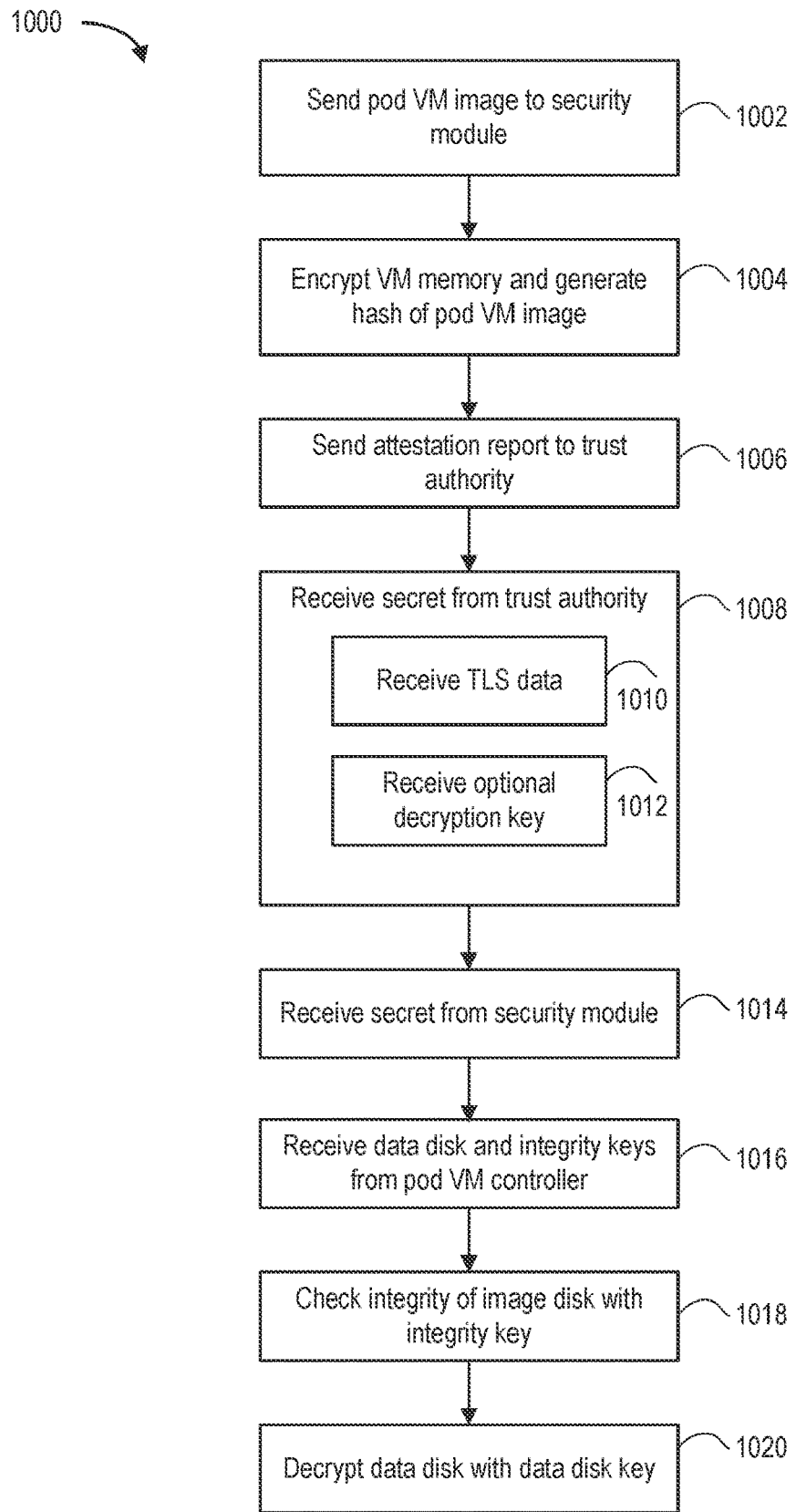
FIG. 10 is a flow diagram depicting a method of secure attestation of a pod VM according to an embodiment.

FIG. 10 is a flow diagram depicting a method 1000 of secure attestation of a pod VM 130 according to an embodiment. In the embodiment, for pod VM 130, guest VM disk image 503 includes an initial OS portion that can be loaded into memory of the VM and optionally an encrypted portion. The initial OS portion loaded into memory functions to establish a secure channel between pod VM 130 and security module 165. Method 1000 begins at step 1002, where pod VM 130 sends the initial OS image to security module 165 (e.g., memory image 508). In embodiments, initial OS image is the entire OS image for pod VM 130. In other embodiments, initial OS image is a portion of VM disk image 503 with some remaining portion of VM disk image 503 being encrypted.

At step 1004, security module 165 encrypts the memory of pod VM 130 and generates a hash of the initial OS image (e.g., an attestation report). At step 1006, security module 165 sends the attestation report to trust authority services 117. As discussed above, trust authority services 117 verifies the attestation report against pre-defined attestation reports. If valid, trust authority services 117 returns a secret to security module 165. At step 1008, security module 165 receives the secret from trust authority services 117. For example, at step 1010, security module 165 receives TLS data (e.g., a public/private key pair and signed certificate). At step 1012, security module 165 optionally receives a decryption key for decrypting the VM disk image in case it is encrypted.

At step 1014, pod VM 130 receives the secret from security module 165. Pod VM 130 can use the TLS data to verify its authenticity to other entities. Pod VM 130 can use a decryption key, if present, to decrypt the remaining portion of its disk image (in case of disk image encryption). At step 1016, pod VM 130 receives a data disk key and an integrity key from pod VM controller 216 (e.g., through pod VM agent 212). Pod VM 130 can verify its identity using the obtained TLS data. At step 1018, pod VM 130 checks the integrity of container image disk(s) with the integrity key. At step 1020, pod VM 130 decrypts attached data disks (persistent volumes) with the data disk key.

Figure 11:
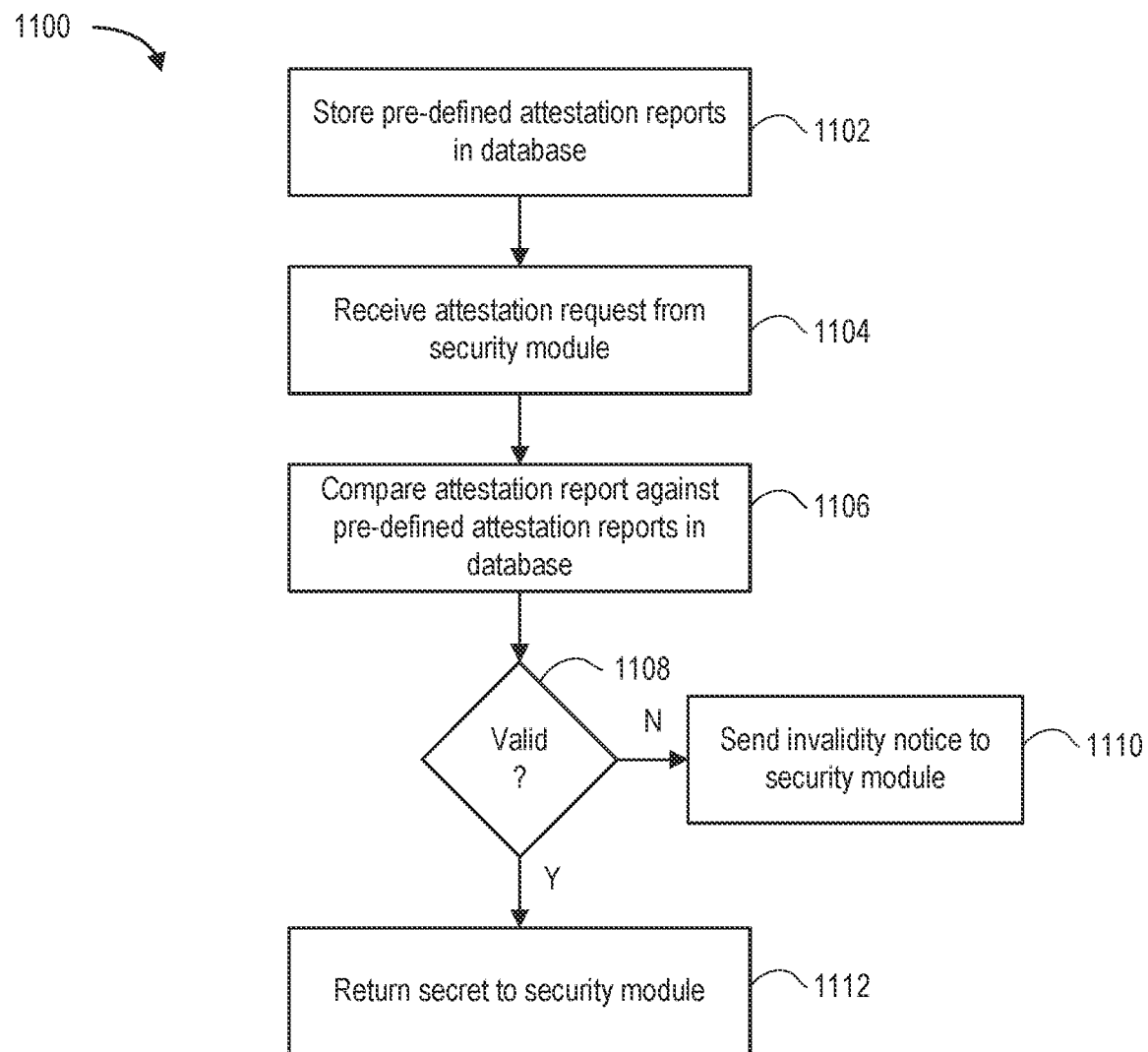
FIG. 11 is a flow diagram depicting a method of processing attestation requests at trust authority services according to an embodiment.

FIG. 11 is a flow diagram depicting a method 1100 of processing attestation requests at trust authority services 117 according to an embodiment. Method 1100 begins at step 1102, where trust authority services 117 stores pre-defined attestation reports (e.g., reports 408) in database 406. The pre-defined attestation reports are generated by a trusted authority for components of virtualized computing system 100 (e.g., supervisor Kubernetes master 104, pod VM controller 216, and pod VM 130). At step 1104, trust authority services 117 receives an attestation request from a security module 165. At step 1106, trust authority services 117 compares the attestation report generated by security module 165 against the pre-defined attestation reports in database 406. At step 1108, trust authority services 117 determines whether the attestation report is valid (e.g., there is a match). If not, at step 1110, trust authority services 117 sends an invalidity notice to security module 165. Otherwise, at step 1112, trust authority services 117 returns a secret to security module 165. The secret can include the various information discussed above depending on the component being attested (e.g., key pair, decryption key(s), certificate(s), etc.).

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of secure attestation of a workload deployed in a virtualized computing system, the virtualized computing system including a host cluster and a virtualization management server, the host cluster having hosts and a virtualization layer executing on hardware platforms of the hosts, the method comprising:
   generating, by a trust authority running on a processor of the virtualization management server, a hash of at least a portion of an image of a virtual machine (VM) managed by the virtualization layer, and then storing, by the trust authority, a pre-defined attestation report that includes the hash generated by the trust authority;
   receiving, at the trust authority from a security module of a host in which the VM executes, an attestation report that the security module generated by hashing at least a portion of the image, wherein a portion of the image is encrypted; and
   determining, by the trust authority, a match between the received attestation report and the pre-defined attestation report, and then transmitting, by the trust authority to the security module, a secret that is acquired from a key management service and used by the VM to access information from the encrypted portion of the image.

2. The method of claim 1, wherein the virtualized computing system includes an orchestration control plane integrated with the virtualization layer and including at least one master server and a pod VM controller, and wherein the VM is a pod VM that includes a container engine supporting execution of containers therein.

3. The method of claim 2, wherein the pod VM controller executes in another VM managed by the virtualization layer.

4. The method of claim 2, wherein the trust authority stores a plurality of pre-defined attestation reports including the pre-defined attestation report, the plurality of pre-defined attestation reports including a first pre-defined attestation report for the master server, a second pre-defined attestation report for the pod VM controller, and a third pre-defined attestation report for the pod VM.

5. The method of claim 1, wherein the trust authority includes a key provider service configured to interface with the key management service.

6. A non-transitory computer readable medium comprising instructions to be executed in a computing device to cause the computing device to carry out a method of secure attestation of a workload deployed in a virtualized computing system, the virtualized computing system including a host cluster and a virtualization management server, the host cluster having hosts and a virtualization layer executing on hardware platforms of the hosts, the method comprising:
   generating, by a trust authority running on a processor of the virtualization management server, a hash of at least a portion of an image of a virtual machine (VM) managed by the virtualization layer, and then storing, by the trust authority, a pre-defined attestation report that includes the hash generated by the trust authority;
   receiving, at the trust authority from a security module of a host in which the VM executes, an attestation report that the security module generated by hashing at least a portion of the image, wherein a portion of the image is encrypted; and
   determining, by the trust authority, a match between the received attestation report and the pre-defined attestation report, and then transmitting, by the trust authority to the security module, a secret that is acquired from a key management service and used by the VM to access information from the encrypted portion of the image.

7. The non-transitory computer readable medium of claim 6, wherein the virtualized computing system includes an orchestration control plane integrated with the virtualization layer and including at least one master server and a pod VM controller, and wherein the VM is a pod VM that includes a container engine supporting execution of containers therein.

8. The non-transitory computer readable medium of claim 7, wherein the pod VM controller executes in another VM managed by the virtualization layer.

9. The non-transitory computer readable medium of claim 7, wherein the trust authority stores a plurality of pre-defined attestation reports including the pre-defined attestation report, the plurality of pre-defined attestation reports including a first pre-defined attestation report for the master server, a second pre-defined attestation report for the pod VM controller, and a third pre-defined attestation report for the pod VM.

10. The non-transitory computer readable medium of claim 6, wherein the trust authority includes a key provider service configured to interface with the key management service.

11. A virtualized computing system, comprising:
   a host cluster and a virtualization management server each connected to a network, wherein the host cluster includes hosts and a virtualization layer executing on hardware platforms of the hosts, and wherein a trust authority is configured to run on a processor of the virtualization management server and is configured to perform secure attestation of a workload deployed in the host cluster by:

generating a hash of at least a portion of an image of a virtual machine (VM) managed by the virtualization layer, and then storing a pre-defined attestation report that includes the hash generated by the trust authority;

receiving, from a security module of a host in which the VM executes, an attestation report that the security module generated by hashing at least a portion of the image, wherein a portion of the image is encrypted; and determining a match between the received attestation report and the pre-defined attestation report, and then transmitting to the security module, a secret that is acquired from a key management service and used by the VM to access information from the encrypted portion of the image.

12. The virtualized computing system of claim 11, further comprising:

an orchestration control plane integrated with the virtualization layer, wherein the orchestration control plane includes at least one master server and a pod VM controller, and wherein the VM is a pod VM that includes a container engine supporting execution of containers therein.

13. The virtualized computing system of claim 12, wherein the pod VM controller executes in another VM managed by the virtualization layer.

14. The virtualized computing system of claim 13, wherein the trust authority stores a plurality of pre-defined attestation reports including the pre-defined attestation report, the plurality of pre-defined attestation reports including a first pre-defined attestation report for the master server, a second pre-defined attestation report for the pod VM controller, and a third pre-defined attestation report for the pod VM.

15. The virtualized computing system of claim 11, wherein the trust authority includes a key provider service configured to interface with the key management service.

* * * * *